No. 788,359. Patented April 25, 1905.

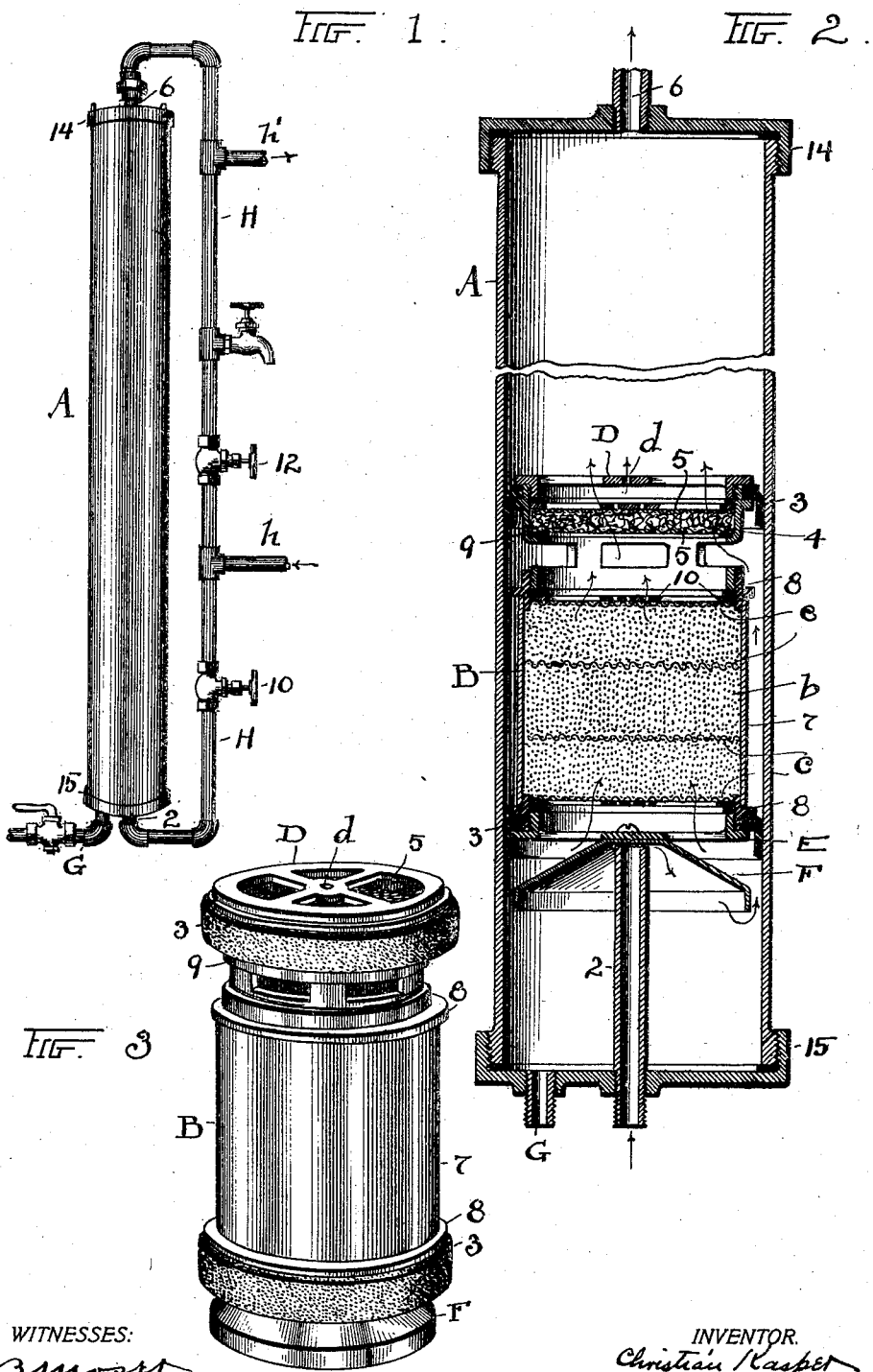

UNITED STATES PATENT OFFICE.

CHRISTIAN KASPER, OF CLEVELAND, OHIO.

WATER-FILTER.

SPECIFICATION forming part of Letters Patent No. 788,359, dated April 25, 1905.

Application filed May 26, 1904. Serial No. 209,833.

*To all whom it may concern:*

Be it known that I, CHRISTIAN KASPER, a citizen of the United States, residing at Cleveland, in the county of Cuyahoga and State of Ohio, have invented certain new and useful Improvements in Water-Filters; and I do declare that the following is a full, clear, and exact description of the invention, which will enable others skilled in the art to which it appertains to make and use the same.

My invention relates to water-filters; and the invention consists in a filter adapted to be set in a service-pipe for a building through which the water-supply enters and which has a suitable casing and a gravity plunger-filter, all substantially as shown and described, and particularly pointed out in the claims.

In the accompanying drawings, Figure 1 is a plain side elevation of my invention, showing the casing in upright position and the water-pipes connected therewith as in use. Fig. 2 is a central vertical sectional elevation of the filter, showing the casing partly broken out at one end and considerably enlarged as compared with Fig. 1. Fig. 3 is a detail of the filtering-plunger.

As thus shown, the invention is designed to filter water by the gravity of the filter proper instead of relying upon the water-pressure from the main, as heretofore universally employed, so far as I know and believe. In all such cases where a filter or filtering medium is interposed in the waterway and water-pressure drives the water through the filter there is an unavoidable deposit of foreign substances upon the exposed surface of the filter, which accumulate and become foul and offensive and exceedingly obnoxious as well as unhealthful as the filtering process goes on. Various schemes have been devised from time to time for getting rid of these accumulations, and in some instances a reversal of the water through the filter has been employed and in others special means for removing the accumulations; but as a rule the objection remained because the tendency in any household or other place where a filter is used is to allow the filter to run as long as it will rather than be to the trouble of cleansing it. My idea is to practically avoid this objection and to employ a filtering medium which both filters and creates the pressure by which filtering is carried on. In other words, I use a gravity-filter or filtering device, which itself creates the pressure by which the water is forced through the filter, and I further plan to protect this filtering medium or filter proper from the direct contact of the unfiltered water by interposing a shield and trap, thereby causing any foreign substances which otherwise might be carried forward against the filter to be deposited in the trap or dead-water space beneath the filter and wherein such deposits may accumulate and be drawn off. It is furthermore provided that practically no filtering shall occur other than through the gravity action of the filter itself, so that the filter is not exposed to such deposits as formerly and as will now be further explained.

Thus A represents a cylinder or casing which is designed to be of such strength as will withstand city pressure here and there and which may be constructed to suit the higher or lower pressures in different cities if this be thought best. Ordinarily the said cylinder is about five feet in length and seven inches in diameter and adapted to hold approximately eight gallons of filtered water above the filter. The said cylinder therefore becomes also in a sense a reservoir for filtered water as well as a filter-casing, and the filter B is adapted to be raised by fluid-pressure through the pipe 2 from its seat or support on said pipe, as seen in Fig. 2, to the top of the cylinder as the filtered water is withdrawn, and suitable gaskets 3 above and below serve to make a perfectly water-tight connection between the filter and the side or wall of cylinder A, thus preventing water from passing the filter about its sides. Any suitable construction of body or embodiment for the filter may be employed, and in this instance the said body B contains what is shown as a "sand-chamber" $b$, with fine wire or mesh $c$ top and bottom and centrally, closely enough woven in any case to confine the sand or other material or medium and yet porous or open to permit a flow of water therethrough, and the water having passed the said sand-chamber it goes next to a fibrous filtering medium consisting in this instance of a heavy layer of cotton 4, supported between suitable wire or like meshes 5 top and bottom, and cotton or any equivalent thereof may be used which will serve as a perfect screen for particles that escape the sand and may be carried forward with the current. Obviously I may incorporate anything I find desirable with the sand, such as charcoal or the like, and I can employ any suitable filtering medium, granular or other, as may be found desirable. When the filter B has been carried forward or upward by the water-pressure, it will continue to travel in this direction as long as water is withdrawn and until it reaches the end of its stroke in the top of the casing, when filtering practically ceases because the outlet-pipe 6 is substantially closed by the spider D at the top of the said filter. This spider has a solid central portion covering the bottom opening of pipe 6 and which closes the said opening, excepting that there is a small orifice $d$ through its center, through which a small portion of water may pass; but this is much less than the capacity of either the inlet or the outlet of the casing, and this preserves my method of filtering, which is designed to operate in such manner that there shall at no time be such pressure of unfiltered water against the filter as will lodge foreign substances thereon. Another spider, E, is screwed into the bottom of filter B and has a substantially saucer-shaped sediment-guard F secured thereto and which cuts off a direct flow of the water through pipe 2 against the bottom of the filter B. This guard deflects and confines the flow of water beneath the same and forms a trap at least as deep as pipe 2 where the foreign substances deposit, while the water is permitted to rise only through the narrow space about the edge of said guard or shield. The sediment trap or chamber of course deepens with the rising of filter B, and the said guard F goes therewith, but makes protection against the bottom of the filter continuous notwithstanding, and when the filter has again descended, as shown in Fig. 2, the supply-pipe 2 is practically closed by the parts resting thereon and which forms a down stop or support for the valve. The said filter in detail comprises a containing-cylinder 7 and internally-threaded and flanged end rings 8, which are duplicates of each other and support said cylinder, and an upper supplemental or head portion 9, constructed to carry the cotton 4 and its mesh and spider D, as shown, and is threaded into the upper ring 8. All the parts of the filter are thus made separable one from another, and the filter can be bodily removed from either end of the casing for renewal of any part or portion, as may be rendered necessary in the use of the filter.

G indicates a drain-pipe at the bottom of the cylinder, and H is an outside pipe connecting with pipes 2 and 6 at the ends of the cylinder and having an inlet or supply pipe $h$ and an outlet $h'$ for the filtered water and valves 10 and 12, respectively, on opposite sides of the inlet or water-supply pipe $h$, whereby valve 10 may be closed and the valve 12 opened and the flow of water through the filter be reversed to cleanse the filter of any possible accumulations upon its surface; or, if desired, the valve 10 may be closed and valve 12 opened, and the filter can be thus cut out and a direct flow of water obtained to the building. Suitable caps or heads 14 and 15 close the ends of the cylinder.

One advantage in having the cotton filtering material in the open-sided head 9, above the filter-body B, is to catch any water that may have crept by the lower packing 3 and cause it to pass through the cotton, and thus be filtered at least to that extent.

In the foregoing method or manner of filtering water it will be noticed that the filter proper is first of all raised in its casing, say, to its limit, which practically cuts off the flow of water through the apparatus. Then, assuming that the draw-off cocks are closed, the lift-water is filtered by the gravity descent of the filter itself, which is heavy enough to do this work with all needed rapidity.

The centrally-arranged wire mesh or screens $c$ are embedded within the sand to more solidly pack the sand and to prevent it from churning during the passage of the water through the same. The head portion 9 of the filter when rotated and screwed into cylinder 7 bears upon an inner spider or packing-ring laid upon the top of the upper wire mesh or screen $c$, and serves to press or pack the sand more or less tightly within the cylinder and as much as may be desired.

What I claim is—

1. In filters, a casing constructed to be set into the service-pipe from a water-main, in combination with a gravity-filter in said casing, said filter being disengaged from said casing at both ends and packed about its side, whereby when water is drawn the filter will rise under pressure from the main and expel the water above the same in the top of the casing, substantially as described.

2. A fluid-filter consisting of a casing having a fluid-inlet at one end and a fluid-outlet at the other end, and a filter in said casing constructed to filter by its own gravity, said casing having fluid-chambers both above and below the filter and the said filter disengaged from the casing at its ends, substantially as described.

3. A water-filter comprising a casing with inlet and outlet openings at its ends and a gravity-filter confined within said casing and constructed to discharge the filtered fluid into the upper end of the said casing, said filter provided with suitable packing about its side against the said casing and free to filter when the flow of water is shut off, substantially as described.

4. A fluid-filter comprising a cylindrical casing having inlet and outlet openings at its respective ends and a gravity-filter therein constructed to rise under pressure as the filtered fluid is withdrawn and to descend by its own gravity when withdrawal of fluid ceases, said filter packed about its side against the inside of the casing and wholly independent of the casing at its ends, whereby the filtered fluid is discharged directly into the top of the casing ready to be drawn off, substantially as described.

5. In filters, a gravity-filter having a chamber filled with granular filtering material and a fibrous material over said chamber to confine said granular material, and a casing in which said filter is confined, said casing having an outlet at its top wholly apart from the filter and the filter free from the casing except about its side, substantially as described.

6. In filters, a casing with an inlet at its bottom for unfiltered fluid and an outlet at its top for filtered fluid, in combination with a gravity-filter in said casing between the ends thereof, and a fluid-inlet pipe projecting into the casing at the bottom and serving as a rest for the filter, thereby also forming a sediment-chamber in the bottom of said casing, substantially as described.

7. In water-filters, a casing having inlet and outlet openings at its respective ends, a gravity-filter in said casing, a fixed stop for said filter projecting into the casing and a shield on the filter over said stop, thereby leaving a space beneath the filter for sedimentary deposits, substantially as described.

8. In water-filters, a casing having an inlet at its bottom and an outlet at its top, a gravity-filter in said casing and a shield interposed between the filter and the said inlet and fixed on said filter, substantially as described.

9. The filter-casing and the plunger-filter therein, and a shield fixed to the bottom of the filter, substantially as described.

10. The filter-casing having a water-inlet below and a water-outlet above, a plunger-filter therein and a substantially dish-shaped shield fixed to the filter over said inlet, substantially as described.

11. The filter-casing having a water-inlet below and a water-outlet above, a gravity-filter in said casing and means controlled by said filter to substantially close said water-outlet when the filter rises to the top of the casing, substantially as described.

12. A water-filter casing having openings at its ends, and a plunger-filter in said casing having a body containing a granular filtering medium and a separate upper portion containing a fibrous filtering medium, and packing about said filter on the side of the casing, substantially as described.

13. In water-filters, a filter-casing provided with an inlet and an outlet at its respective ends, a filter within said casing between said inlet and outlet ends and disconnected from said ends and constructed to discharge the water within the upper end of the said casing, substantially as described.

In testimony whereof I sign this specification in the presence of two witnesses.

CHRISTIAN KASPER.

Witnesses:
 R. B. MOSER,
 C. A. SELL.